United States Patent [19]

Schluter et al.

[11] 3,851,520
[45] Dec. 3, 1974

[54] GAS MONITORING SYSTEM

[75] Inventors: Bernard C. Schluter, Forest Lake; Erik T. Tromborg, Bloomington, both of Minn.

[73] Assignee: Honeywell Inc., Minneapolis, Minn.

[22] Filed: May 22, 1973

[21] Appl. No.: 362,651

[52] U.S. Cl. .................................... 73/23, 73/1 R
[51] Int. Cl. .......................................... G01n 31/00
[58] Field of Search ............. 73/23, 27 R, 1 R; 23/254 E, 232 E

[56] References Cited
UNITED STATES PATENTS 2,591,760  4/1952  Zaikowsky .................... 73/27 R X
2,591,761  4/1952  Zaikowsky .................... 73/27 R X Primary Examiner—James J. Gill
Assistant Examiner—Stephen A. Kreitmas
Attorney, Agent, or Firm—Charles J. Ungemach; Albin Medved; John S. Munday

[57] ABSTRACT

A method of monitoring the amount of pollutant in a gas comprising the steps of passing the gas through a first sensor to obtain a first output signal indicative of the amount of pollutant therein, passing the gas through a dilution means capable of removing a known percentage of the pollutant and passing the gas next through a second sensor to obtain a second output signal indicative of the amount of pollutant remaining.

2 Claims, 1 Drawing Figure

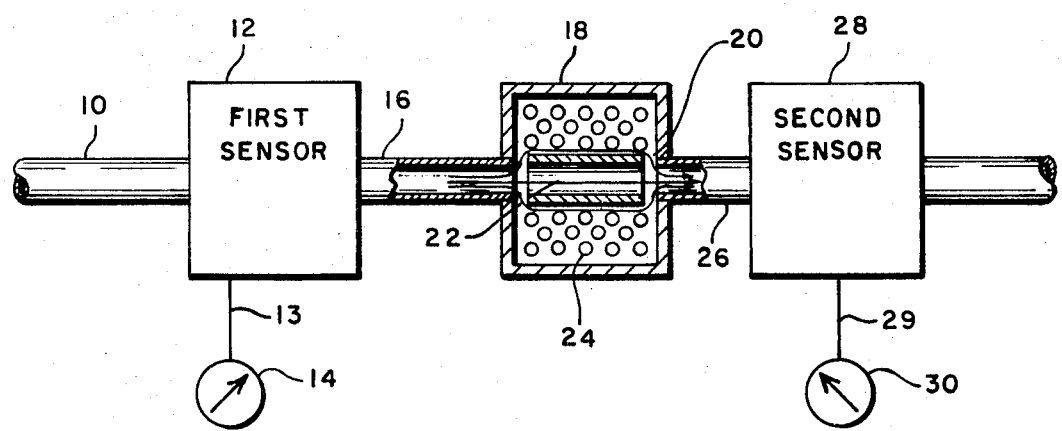

GAS MONITORING SYSTEM

BACKGROUND OF THE INVENTION

Surveillance of gases to detect the existence and extent of pollutants therein is becoming more widely practiced in various industries. Sensors have been developed which are capable of providing a signal indicative of the amount of various pollutants contained in various gases. For example, sensors have been developed which can indicate the parts per million of hydrocarbons present in the atmosphere, to a reasonably accurate degree.

Many sensors are currently available in the marketplace. Most of all these require some interaction between the pollutant and the sensing device. In those situations where long periods of time go by with the pollutant in the gas, a sensor can be saturated, and may then indicate a false value for the amount of pollutant actually present. Alternatively, it is quite possible for the relative amount of pollutant in the gas to actually decrease. Thus, the capability of distinguishing between these two very different instances is needed if monitoring of the gas is to be of optimum value to the one doing the monitoring.

Other sensors are of the type where it has a response such that with increasing concentrations the response initially rises then reaches a maximum, and subsequently diminishes. Thus at a given response it is not possible to determine if it is caused by the first concentration caused by the initial low concentration rising response or by the second concentration caused by diminished response upon overloading of the sensor. Again it is important to be able to distinguish between these two cases.

OBJECTS OF THE INVENTION

Accordingly, it is an object of this invention to provide a method of monitoring pollutants in a steady stream of gas.

More specifically, it is an object of this invention to provide a method capable of distinguishing between a first condition wherein a pollutant has saturated a sensor and a second condition wherein the concentration of the pollutant has actually decreased.

Yet another object is to provide an invention which is capable of distinguishing between two different concentrations of pollutant which might give the same response on a sensor due to decreases in readings when saturation of the sensor occurs.

Other objects will appear hereinafter.

DESCRIPTION OF THE INVENTION

Accordingly, it has now been discovered that the objects of the present invention can be accomplished in the following manner. Specifically, it has been discovered that gas may be monitored to determine the quantitiy of pollutant contained therein by first passing the gas through a first sensor to obtain a first signal indicative of the amount of pollutant therein, passing the gas next through a dilution means, said dilution means being adapted to remove a known percentage of the pollutant from that gas, and finally passing the gas through a second sensor to obtain a second signal indicative of the amount of pollutant remaining.

In a preferred embodiment, the method of this invention includes passing a known portion of the gas through an absorbing means for absorbing the pollutant and a remaining portion of the gas is by-passed away from the absorbing means so that a known percentage of the pollutant has been removed.

DESCRIPTION OF THE DRAWING

The FIGURE represents a partially cutaway schematic drawing showing apparatus capable of performing the method of this invention.

Shown first is a pipe or line 10 containing a gas having a pollutant contained therein. The gas flows through line 10 into the first sensor 12 which sends a signal 13 to gage 14 giving a signal indicative of the amount of pollutant therein. The gas then leaves the first sensor 12 through line 16 and enters a dilution means 18. A portion of the gas contained in or passing through the dilution means 18 passes straight through the interior of the dilution means through pipe 20 in area 22. A second portion of the gas entering the dilution means 18 passes through area 24 which contains a means for removing the pollutant from the gas. The ratio of gas flow through each portion can be mechanically fixed to fix the percentage of pollutant removed. Gas passes through tube 16 to tube 26 by passing in part through center tube 22 and in part through outer area 24. By varying the size of each, a mechanical expedient, the ratio of gas passing through one would be controlled. Depending upon what pollutant is involved, and what gas, various materials such as activated charcoal, Fuller's earth, ion exchange resins, and the like may be used in a known manner to remove the pollutant. All of the gas exits the dilution means 18 through line 26 and enters the second sensor 28. The second sensor 28 provides a second signal through line 29 to gage 30 indicating the amount of pollutant remaining therein.

As can be seen, the method of this invention provides the monitor with two separate output signals. Since a known percentage of the pollutant has been removed from the gas through the dilution means, the reading of the second sensor should be directly proportional to the reading of the first sensor. In those cases when both sensors are operating properly, the reading on the first sensor will be directly proportional to the reading on the second sensor by an amount determined from the known percentage of pollutant removed by the dilution means. However, in those instances where the first sensor may be saturated from excessive contact with the pollutant, that reading will be lower than the proportional reading required for it to conform to the second reading. For example, if the dilution means removes two thirds of the pollutant contained in the gas, then the second output should be one third as great as the first signal. As long as these two signals maintain a three to one relationship, one monitoring the gas can be assured that accurate readings are being presented. Thus, if the true reading which is the reading of the first signal decreases, the monitor can determine that this reading is accurate by a corresponding three to one reduction in the second signal. If, however, the first sensor becomes saturated, a decrease without a corresponding proportional decrease in the second sensor indicates saturation and allows for the taking of whatever measures are deemed necessary by the monitor.

Various embodiments of the present invention may be achieved without departing from the spirit of this invention.

Having thus described the invention, what is claimed is:

1. A method of monitoring a gas which contains a pollutant, comprising:
    passing the gas through a first sensor to obtain a first signal indicative of the amount of pollutant therein;
    passing the gas next through a dilution means, said dilution means being adapted to remove a known quantity of said pollutant from said gas;
    passing said gas next through a second sensor to obtain a second signal indicative of the amount of pollutant remaining therein; and
    wherein said dilution means passes a known percentage of said gas through an absorbing means for absorbing said pollutant and the remaining percentage of said gas is passed directly to said second sensor.

2. Apparatus for monitoring a gas which contains a pollutant, comprising:
    first sensing means for obtaining a first signal indicative of the amount of pollutant contained in said gas;
    dilution means sequentially connected to said first sensor for receiving gas from said sensor and adapted to remove a known percentage of said pollutant from said gas;
    second sensing means adapted to receive said gas from said dilution means and to indicate a second signal indicative of the amount of pollutant remaining in said gas; and
    said dilution means including an absorption means for absorbing a portion of said pollutant from said gas and further containing by-pass means for passing the remaining portion of said gas directly from said first sensor to said second sensor.

* * * * *